US012701521B2

(12) United States Patent
Sadiq et al.

(10) Patent No.: US 12,701,521 B2
(45) Date of Patent: Aug. 4, 2026

(54) RESYNCHRONIZATION OF DEVICES THAT USE DIFFERENT TIMING REFERENCES

(71) Applicant: Samsung Electronics Co., Ltd., Suwon-si (KR)

(72) Inventors: Bilal Sadiq, Plano, TX (US); Boon Loong Ng, Plano, TX (US); Junsung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 18/628,620

(22) Filed: Apr. 5, 2024

(65) Prior Publication Data

US 2025/0024388 A1      Jan. 16, 2025

Related U.S. Application Data

(60) Provisional application No. 63/526,649, filed on Jul. 13, 2023.

(51) Int. Cl.
*H04W 56/00* (2009.01)
*H04J 3/06* (2006.01)

(52) U.S. Cl.
CPC ....... *H04W 56/0015* (2013.01); *H04J 3/0658* (2013.01); *H04W 56/003* (2013.01)

(58) Field of Classification Search
CPC ............. H04W 56/003; H04W 56/0015; H04J 3/0658
USPC .......................................................... 370/503
See application file for complete search history.

(56) References Cited

U.S. PATENT DOCUMENTS

| | | | |
|---|---|---|---|
| 9,622,158 B2 * | 4/2017 | Lunden | ................. H04W 48/20 |
| 10,098,083 B2 | 10/2018 | Sun et al. | |
| 2013/0016757 A1 | 1/2013 | Hui et al. | |
| 2013/0183905 A1 | 7/2013 | Richardson | |
| 2014/0044118 A1 * | 2/2014 | Kim | ................. H04W 56/0005 |
| | | | 370/338 |
| 2014/0254426 A1 * | 9/2014 | Abraham | .......... H04W 52/0216 |
| | | | 370/254 |
| 2014/0286301 A1 | 9/2014 | Werb et al. | |

(Continued)

FOREIGN PATENT DOCUMENTS

| | | |
|---|---|---|
| CN | 111867042 B | 11/2022 |
| KR | 10-2016-0090323 A | 7/2016 |
| WO | 2023091234 A1 | 5/2023 |

OTHER PUBLICATIONS

International Search Report and Written Opinion issued Jul. 31, 2024, regarding International Application No. PCT/KR2024/005293, 8 pages.

(Continued)

*Primary Examiner* — Peter G Solinsky

(57) ABSTRACT

A method includes repeatedly sending, by a first device, sync beacons to a second device in a target network at a first frequency. The method also includes determining that the second device will use beacons received from an unrelated sync provider (USP) device for synchronization of a clock of the second device with the target network. The method further includes repeatedly sending the sync beacons to the second device at a second frequency that is less frequent than the first frequency. The second frequency is determined based on a maximum synchronization error tolerance of the target network.

20 Claims, 11 Drawing Sheets

(56)           References Cited

U.S. PATENT DOCUMENTS

| 2017/0006562 | A1  | 1/2017 | Kim et al. |
| 2017/0064690 | A1  | 3/2017 | Nord |
| 2018/0049130 | A1* | 2/2018 | Huang .............. H04W 52/0235 |

OTHER PUBLICATIONS

Supplementary European Search Report dated Jun. 1, 2026, in connection with European Patent Application No. 1 24839865, 5 pages.

* cited by examiner

RESYNCHRONIZATION OF DEVICES THAT USE DIFFERENT TIMING REFERENCES

CROSS-REFERENCE TO RELATED APPLICATION(S) AND CLAIM OF PRIORITY

This application claims priority under 35 U.S.C. § 119 (e) to U.S. Provisional Patent Application No. 63/526,649, filed on Jul. 13, 2023, which is hereby incorporated by reference in its entirety.

TECHNICAL FIELD

This disclosure relates generally to wireless communications systems. Embodiments of this disclosure relate to methods and apparatuses for resynchronization of devices that use different timing references.

BACKGROUND

Many device-to-device discovery or communication technologies (such as Wi-Fi Aware (also known as Neighbor Awareness Networking or NAN), NR sidelink, and LTE sidelink) require two or more devices to be sufficiently synchronized. Therefore, these technologies often also specify how to achieve and maintain synchronization. For example, a device with a Master or Timing Anchor role becomes a primary timing reference (a source of synchronization or reference clock), and periodically transmits an indication of time according to its clock. Such a transmission is sometimes called a sync beacon. The devices receiving this sync beacon adjust their local clocks based on the received time indication. Thus, some devices bear the burden of transmitting sync beacons in order to achieve or maintain synchronization between two or more devices. This burden may be in terms of power consumption, maintaining a clock of sufficient accuracy, communication resources, and the like.

SUMMARY

Embodiments of the present disclosure provide methods and apparatuses for resynchronization of devices that use different timing references.

In one embodiment, a method includes repeatedly sending, by a first device, sync beacons to a second device in a target network at a first frequency. The method also includes determining that the second device will use beacons received from an unrelated sync provider (USP) device for synchronization of a clock of the second device with the target network. The method further includes repeatedly sending the sync beacons to the second device at a second frequency that is less frequent than the first frequency. The second frequency is determined based on a maximum synchronization error tolerance of the target network.

In another embodiment, a device includes a transceiver and a processor operably connected to the transceiver. The processor is configured to: control the transceiver to repeatedly send sync beacons to a second device in a target network at a first frequency; determine that the second device will use beacons received from an USP device for synchronization of a clock of the second device with the target network; and control the transceiver to repeatedly send the sync beacons to the second device at a second frequency that is less frequent than the first frequency. The processor is configured to determine the second frequency based on a maximum synchronization error tolerance of the target network.

In another embodiment, a non-transitory computer readable medium includes program code that, when executed by a processor of a device, causes the device to: repeatedly send sync beacons to a second device in a target network at a first frequency; determine that the second device will use beacons received from an USP device for synchronization of a clock of the second device with the target network; and repeatedly send the sync beacons to the second device at a second frequency that is less frequent than the first frequency. The second frequency is determined based on a maximum synchronization error tolerance of the target network.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
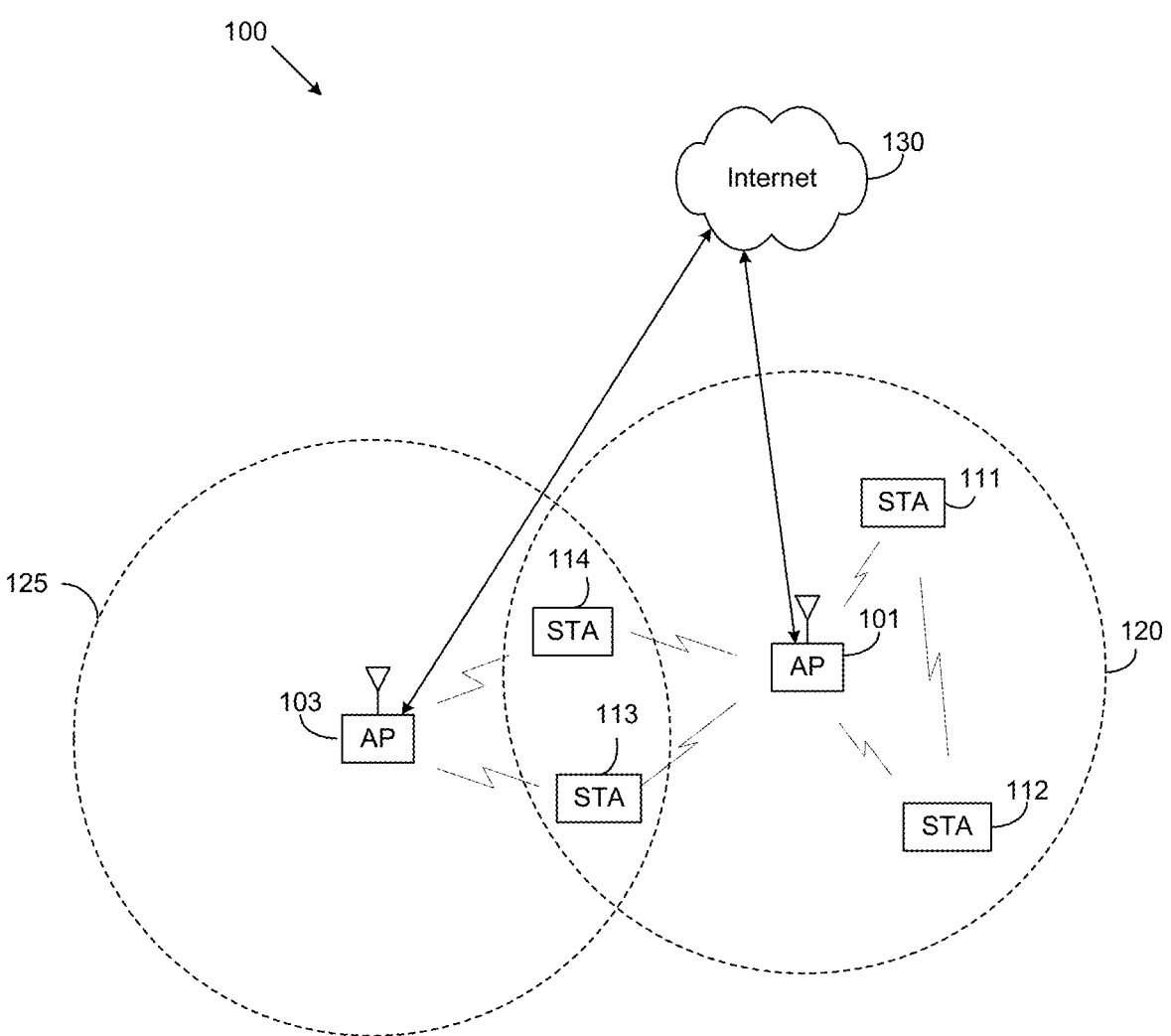
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN (wireless local area network) communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming to enable resyn- chronization of devices that use different timing references. Although FIG. 1 illustrates one example of a wireless network 100, various changes may be made to FIG. 1. For example, the wireless network 100 could include any num- ber of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provide STAs with direct wireless broad- band access to the network 130. Further, the APs 101 and/or 103 could provide access to other or additional external networks, such as external telephone networks or other types of data networks.

Figure 2A:
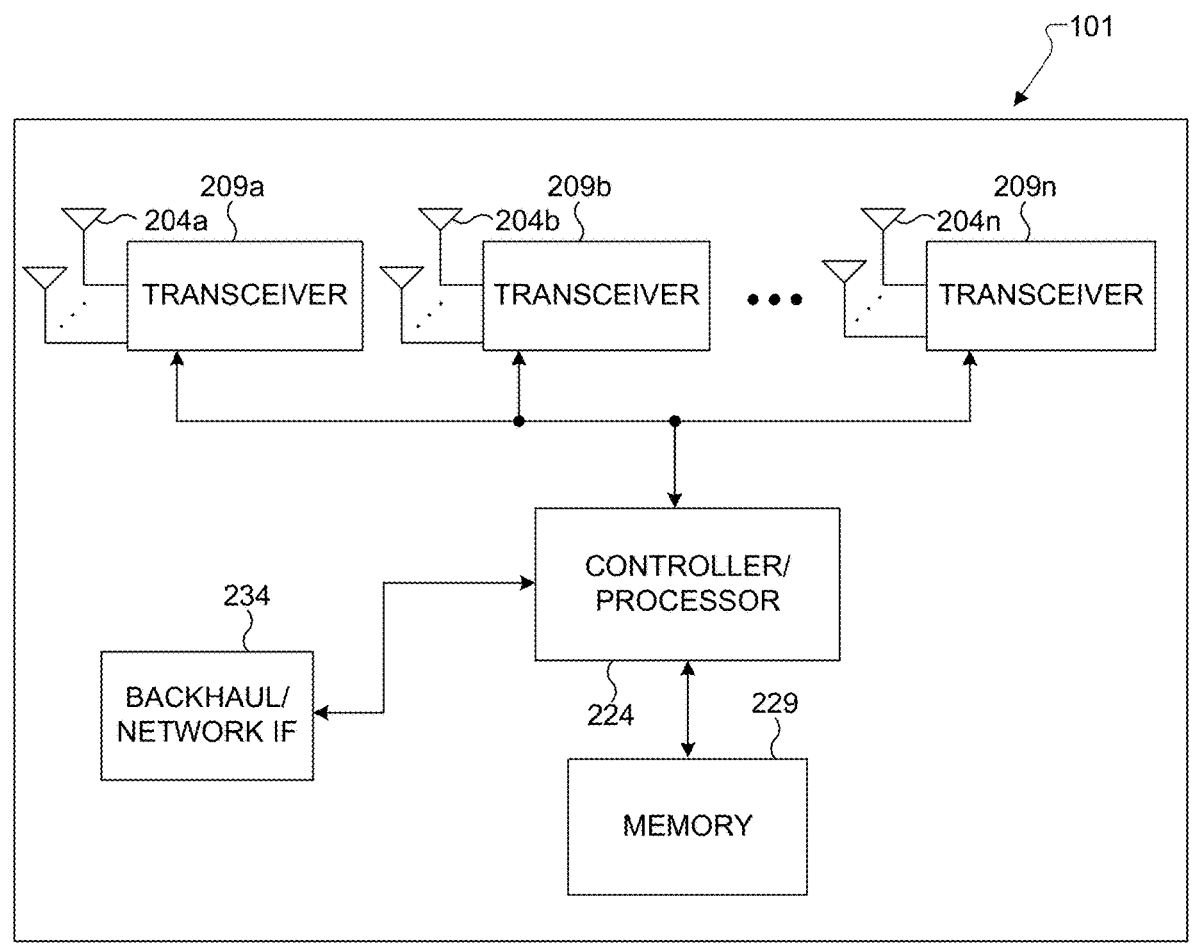
FIG. 2A illustrates an example AP according to various embodiments of the present disclosure.

FIG. 2A illustrates an example AP 101 according to various embodiments of the present disclosure. The embodi- ment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n and multiple transceivers 209a-209n. The AP 101 also includes a controller/processor 224, a memory 229, and a backhaul or network interface 234. The transceivers 209a-209n receive, from the antennas 204a-204n, incoming radio frequency (RF) signals, such as signals transmitted by STAs 111-114 in the network 100. The transceivers 209a-209n down-convert the incoming RF signals to generate IF or baseband signals. The IF or baseband signals are processed by receive (RX) processing circuitry in the transceivers 209a-209n and/or controller/processor 224, which generates processed base- band signals by filtering, decoding, and/or digitizing the baseband or IF signals. The controller/processor 224 may further process the baseband signals.

Transmit (TX) processing circuitry in the transceivers 209a-209n and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209a- 209n up-converts the baseband or IF signals to RF signals that are transmitted via the antennas 204a-204n.

The controller/processor 224 can include one or more processors or other processing devices that control the overall operation of the AP 101. For example, the controller/ processor 224 could control the reception of forward chan- nel signals and the transmission of reverse channel signals by the transceivers 209a-209n in accordance with well- known principles. The controller/processor 224 could sup- port additional functions as well, such as more advanced wireless communication functions. For instance, the con- troller/processor 224 could support beam forming or direc- tional routing operations in which outgoing signals from multiple antennas 204a-204n are weighted differently to effectively steer the outgoing signals in a desired direction. The controller/processor 224 could also support OFDMA operations in which outgoing signals are assigned to differ- ent subsets of subcarriers for different recipients (e.g., dif- ferent STAs 111-114). Any of a wide variety of other functions could be supported in the AP 101 by the controller/ processor 224 including resynchronization of devices that use different timing references. In some embodiments, the controller/processor 224 includes at least one microproces- sor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the back- haul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wire- less connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for resynchronization of devices that use different timing references. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between dif- ferent network addresses. Alternatively, only one antenna and transceiver path may be included, such as in legacy APs. Also, various components in FIG. 2A could be combined, further subdivided, or omitted and additional components could be added according to particular needs.

Figure 2B:
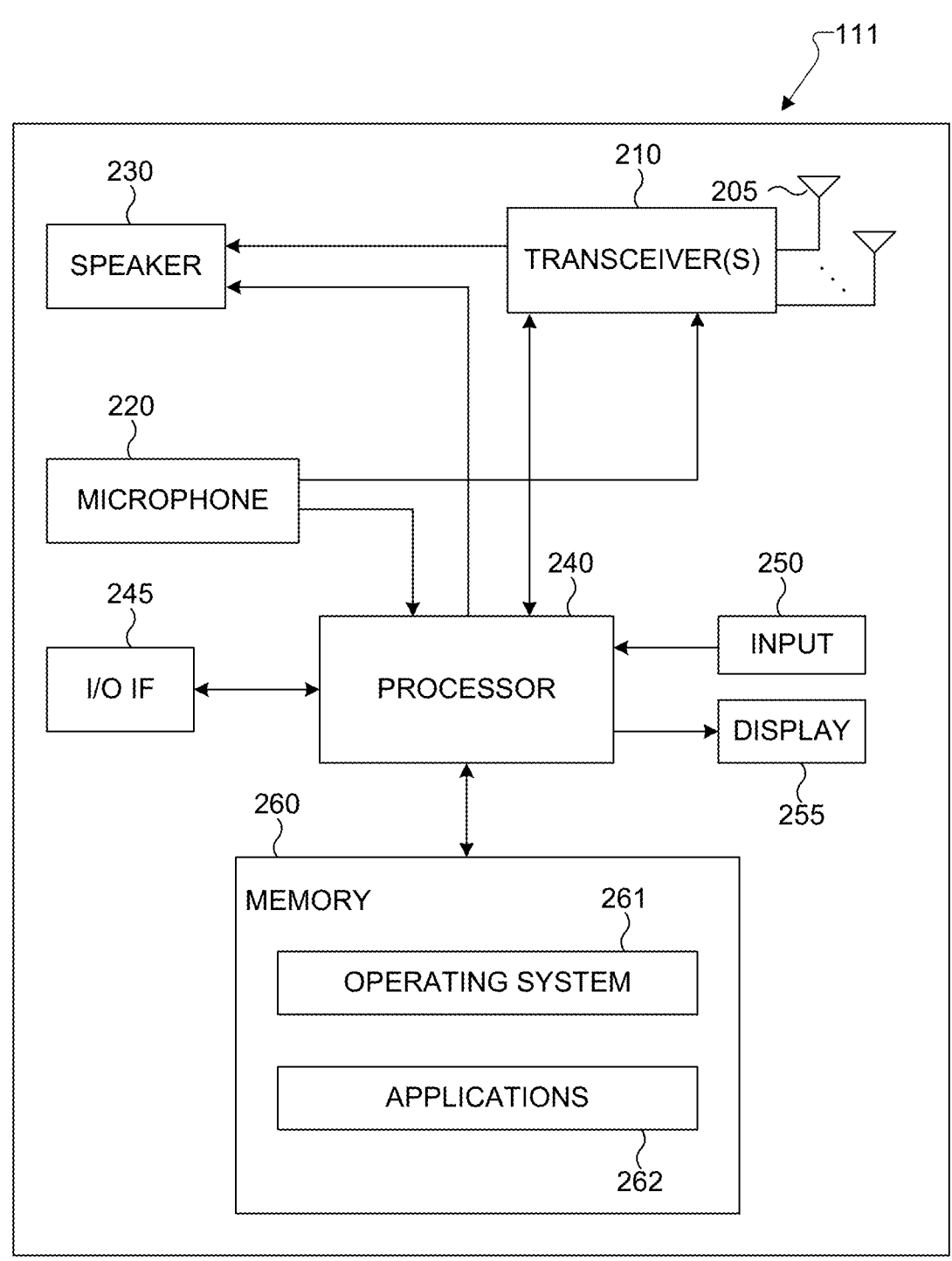
FIG. 2B illustrates an example STA according to various embodiments of the present disclosure.

FIG. 2B illustrates an example STA 111 according to various embodiments of the present disclosure. The embodi- ment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to enable resynchronization of devices that use different timing references. In some embodiments, the processor 240 includes at least one microprocessor or microcontroller.

The processor 240 is also capable of executing other processes and programs resident in the memory 260, such as operations for enabling resynchronization of devices that use different timing references. The processor 240 can move data into or out of the memory 260 as required by an executing process. In some embodiments, the processor 240 is configured to execute a plurality of applications 262, such as applications to enable resynchronization of devices that use different timing references. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed earlier, many device-to-device discovery or communication technologies (such as Wi-Fi Aware (also known as Neighbor Awareness Networking or NAN), NR sidelink, and LTE sidelink) require two or more devices to be sufficiently synchronized. Therefore, these technologies often also specify how to achieve and maintain synchronization. For example, a device with a Master or Timing Anchor role becomes a primary timing reference (a source of synchronization or reference clock), and periodically transmits an indication of time according to its clock. Such a transmission is sometimes called a sync beacon. The devices receiving this sync beacon adjust their local clocks based on the received time indication. A simple adjustment may be to match the time on the local clock with the time indicated in the received message from the Master. In some technologies, the devices receiving sync beacons in turn may become secondary sources of synchronization and transmit further sync beacons to propagate the reference clock to other (e.g., farther) devices. In summary, some devices bear the burden of transmitting sync beacons in order to achieve or maintain synchronization between two or more devices. This burden may be in terms of power consumption, maintaining a clock of sufficient accuracy, communication resources, and the like.

In order to reduce the burden of maintaining synchronization, it has also been proposed to opportunistically use sync beacons of other networks, clusters, or devices to derive synchronization for the network of two or more devices at hand. For ease of explanation, the network of devices for which synchronization needs to be maintained can be referred to as the target network, whereas a device unrelated to the target network whose sync beacon transmission is exploited to derive synchronization for the target network can be referred to as an unrelated sync provider (USP).

Using an USP for synchronizing a target network involves computing an offset (a time difference) between the reference time of the target network and the time as indicated in the sync beacon of an USP, and subsequently deriving the reference time for the target network by applying the offset to the time indicated in the sync beacon of the USP. In this manner, the sync beacons of the USP can be exploited to relieve the master of the target network from the burden of transmitting sync beacons. Still, using an USP in this manner may be limited to situations where all devices in the target network are able to receive the sync beacons transmitted by the unrelated sync provider.

More generally, a first set of one or more devices of the target network may use a first USP, whereas a second set of one or more devices of the target network may use a second USP. Devices in both the first set and the second may follow a similar procedure (as described above) of computing an offset with respect to their respective USP, and subsequently using the offset and a time indicated in the sync beacons from their respective unrelated sync provider to derive synchronization for the target network. However, the clocks of the first and the second USPs will typically drift apart over time, and so would the reference times of the target network as kept by the first set and the second set of devices.

Figure 3:
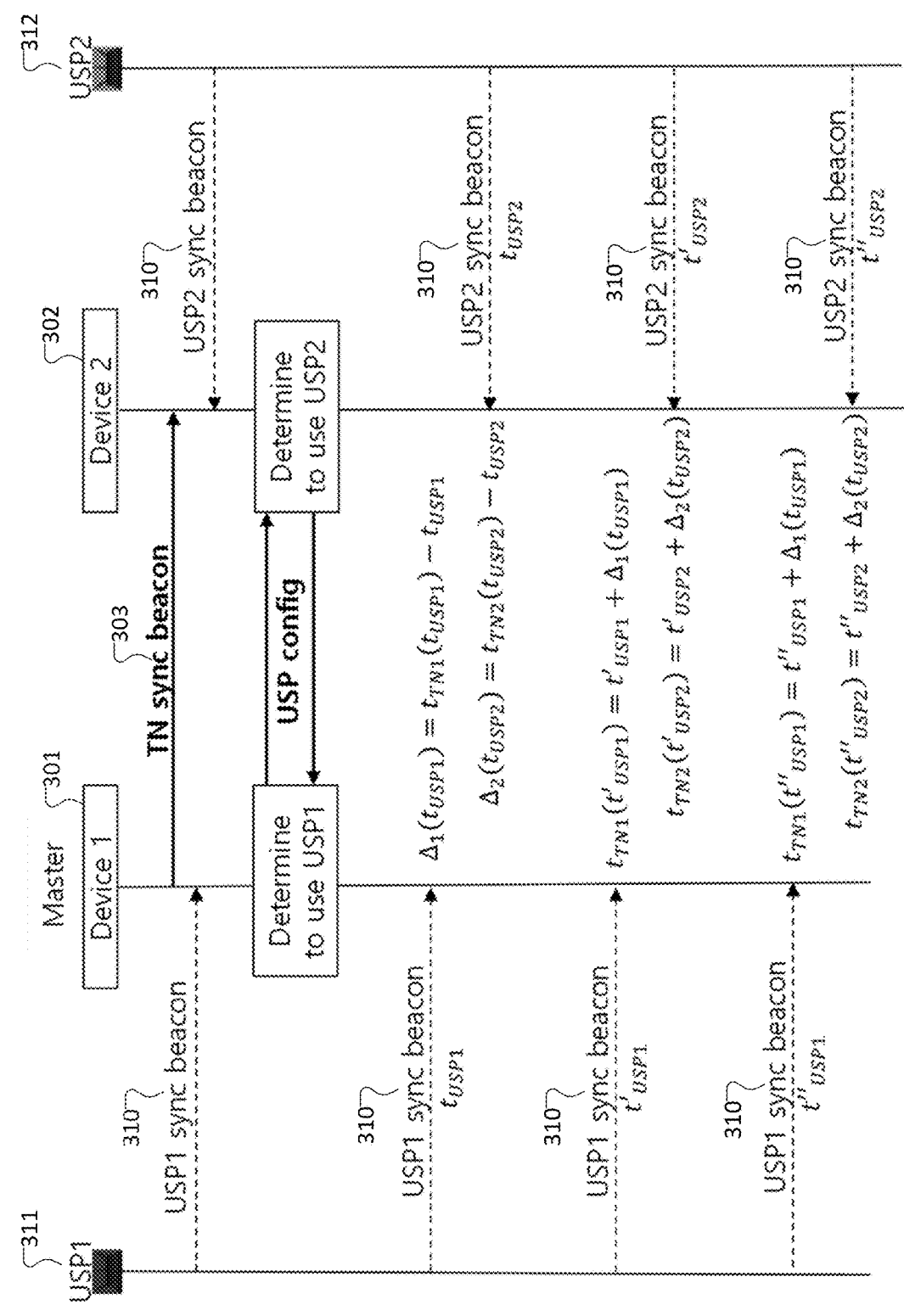
FIG. 3 illustrates a target network in which resynchronization of devices can be performed.

As a simple example, FIG. 3 illustrates a target network 300 in which resynchronization of devices can be performed. In some embodiments, the target network 300 is a NAN network. As shown in FIG. 3, the target network 300 include multiple devices, including devices 301 and 302. The device 301 is a NAN master device and the device 302 is a NAN non-master device. The device 301 sends sync beacons 303 from time $t_0$ time (e.g., during every discovery window that occurs periodically), and the device 302 adjusts its local clock based on the time indication in the received sync beacons 303. As a result, the target network 300 is sufficiently synchronized and it is assumed that the instantaneous time difference between the reference time of the target network 300 as kept by the device 301 (master) and that as kept by the device 302 is negligible, e.g., almost zero.

Both devices 301 and 302 determine that each can receive sync beacons 310 from a corresponding USP. For example, the device 301 can receive sync beacons 310 from the USP 311 (e.g., a first Wi-Fi AP), whereas the device 302 can receive sync beacons 310 from the USP 312 (e.g., a second Wi-Fi AP). The USPs 311 and 312 are distinct in this example, and each has its own clock. The devices 301 and 302 determine to use their respective USPs 311 and 312 to maintain synchronization for the target network 300. In general, using a USP may be beneficial for a device when the clock of a USP has better accuracy than the clock of the device, or it allows the device to save power required to maintain its clock.

The device 301 may calculate an offset (e.g., an instantaneous time difference) between the reference time of the target network 300 and the time as indicated in the sync beacon 310 of its USP 311. For example, the device 301 may calculate $$\Delta_1(t_{USP1}) = t_{TN1}(t_{USP1}) - t_{USP1},$$

where $t_{USP1}$ denotes a time according to the timing indication in the USP 311's sync beacon 310 (for short, referred to as time according to the USP 311), $t_{TN1}(t_{USP1})$ denotes the reference time of the target network 300 as kept by the clock of the device 301 at the instant when time according to the USP 311 is $t_{USP1}$, and $\Delta_1(t_{USP1})$ is the calculated offset corresponding to the instant when time according to the USP 311 is $t_{USP1}$.

Likewise, the device 302 may calculate an offset between the reference time of the target network and the time as indicated in the sync beacon 310 of its USP. For example, the device 302 may calculate $$\Delta_2(t_{USP2}) = t_{TN2}(t_{USP2}) - t_{USP2},$$

where $t_{USP2}$ denotes a time according to the timing indication in the USP 312's sync beacon 310 (for short, referred to as time according to the USP 312), $t_{TN2}(t_{USP1})$ denotes the reference time of the target network 300 as kept by the clock of the device 302 at the instant when time according to the USP 312 is $t_{USP2}$, and $\Delta_2(t_{USP2})$ is the calculated offset corresponding to the instant when time according to the USP 312 is $t_{USP2}$.

The instantaneous time difference between the two USPs 311 and 312 can be defined as the following:

$$\delta(t_{USP1}) = t_{USP2}(t_{USP1}) - t_{USP1},$$

where $t_{USP2}(t_{USP1})$ denotes the time according to the timing indication in a sync beacon 310 of the USP 312 at an instant when the time according to the timing indication in a sync beacon 310 of the USP 311 is $t_{USP1}$. Therefore, $\delta(t_{USP1})$ may be seen as the time difference between the two USPs 311 and 312 at the instant when the time according to USP 311 is $t_{USP1}$. This time difference is due to clock drift between the clocks of the USPs 311 and 312.

As discussed earlier, the devices 301 and 302 determine to use their respective USPs 311 and 312 to maintain synchronization for the target network 300. Subsequently, when a device 301 and 302 receives a sync beacon 310 from its respective USP 311 and 312, the devices 301 and 302 may adjust its reference time for the target network 300 based on the current time according to its USP 311 and 312. For example, let $t_{USP1}'$ denote the time according to the timing indication in a next received sync beacon 310 by the device 301 from the USP 311. Then the device 301 may derive a reference time for target network 300 based on $t_{USP1}'$ and the offset calculated earlier, as per the following:

$$t_{TN1}(t_{USP1}') = t_{USP1}' + \Delta_1(t_{USP1})$$

where $t_{TN1}(t_{USP1}')$ denotes the adjusted value of the reference time of the target network 300 as kept by the device 301 at the instant when the time according to the USP 311 is $t_{USP1}'$. Similarly, let $t_{USP2}'$ denote the time according to the timing indication in the next received sync beacon by the device 302 from the USP 312. Then the device 302 may derive a reference time for the target network 300 based on $t_{USP2}'$ and the offset calculated earlier, as per the following:

$$t_{TN2}(t_{USP2}') = t_{USP2}' + \Delta_2(t_{USP2})$$

where $t_{TN2}(t_{USP2}')$ denotes the adjusted value of the reference time of the target network 300 as kept by the device 302 at the instant when time according to the USP 312 is $t_{USP2}'$.

Now consider the current instantaneous time difference between the two USPs 311 and 312, which can be defined by the following:

$$\delta(t_{USP1}') = t_{USP2}(t_{USP1}') - t_{USP1}',$$

where $\delta(t_{USP1}')$ may be seen as the time difference between the two USPs 311 and 312 at the instant when the time according to the USP 311 is $t_{USP1}'$. In general, this current time difference $\delta(t_{USP1}')$ will likely not be equal to the earlier time difference $\delta(t_{USP1})$. Moreover, in general, the two time differences will drift farther and farther apart over time, i.e., $|\delta(t_{USP1}') - \delta(t_{USP1})|$ will in general grow larger and larger as $t_{USP1}' - t_{USP1}$ grows. Note that $t_{USP1}' - t_{USP1}$ denotes the time elapsed between calculating the offset $\Delta_1$ (and approximately also $\Delta_2$) and subsequently using this offset to update the reference time of the target network 300. The quantity $|\delta(t_{USP1}') - \delta(t_{USP1})|$ can be referred to as clock drift between the USPs 311 and 312 over the time interval $t_{USP1}' - t_{USP1}$.

As a result of the growing clock drift, even though the target network 300 was synchronized before the devices 301 and 302 started using the USPs 311 and 312 to derive a reference time for the target network 300 (i.e., the instantaneous time difference between the reference time of the target network 300 as kept by the device 301 (master) and that as kept by the device 302 was negligible), the synchronization error will typically grow, e.g., by an amount equal to the clock drift.

Figure 4:
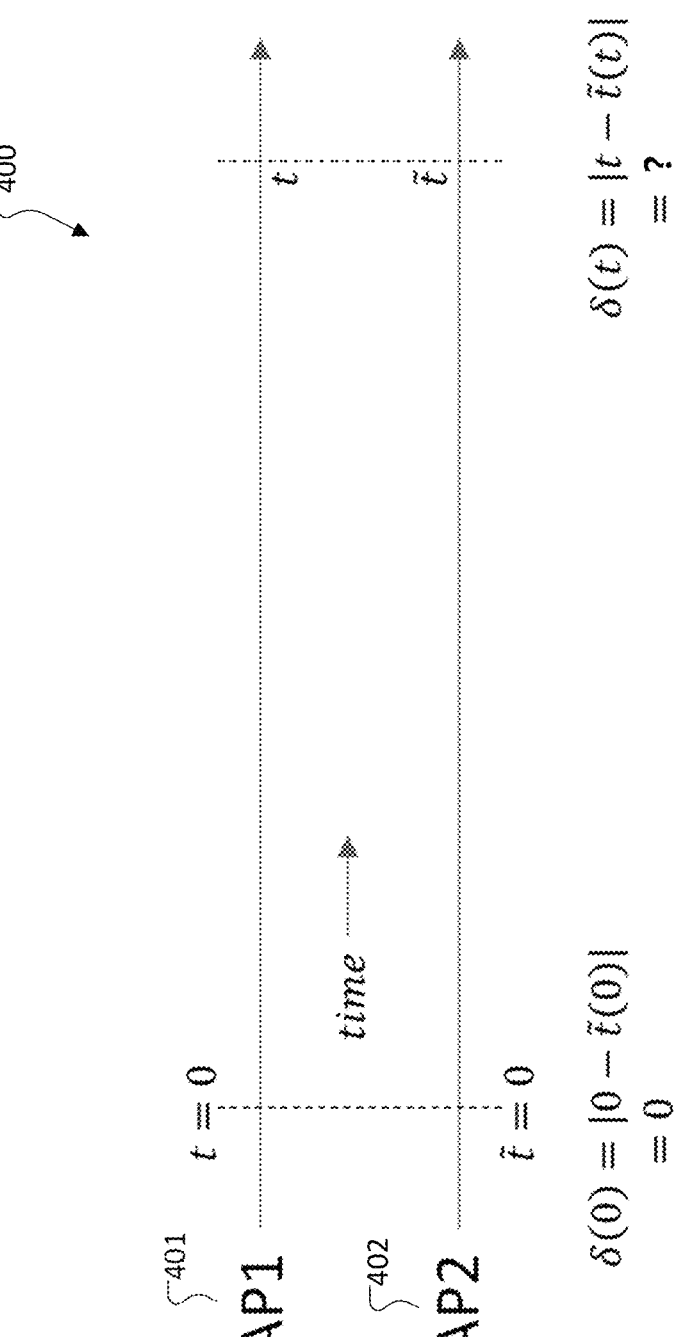
FIG. 4 illustrates an example timeline showing clock drift among APs in a network.

To better illustrate the concept of clock drift, FIG. 4 illustrates an example timeline 400 showing clock drift among APs in a network. As shown in FIG. 4, in the timeline 400, two APs 401 and 402—denoted as AP1 and AP2—each have their own clocks. In some embodiments, the APs 401 and 402 can represent the USPs 311 and 312 of FIG. 3.

Let t denote the time according to the clock of the AP 401 (e.g., t is AP1 time synchronization function (TSF)). Let $\hat{t}(t)$ denote the time according to the clock of the AP 402 when the time on AP 401 clock is t.

Without loss of generality, assume $\tilde{t}(0)=0$; in other words, the two AP clocks are aligned at time t=0. This is the time of first offset calculation.

After time t (according to the clock of the AP 401), the clock drift or timing error between two the AP clocks is given by the following:

$$\delta(t) = |t - \tilde{t}(t)|.$$

The clock drift $\delta(t)$ is bounded due to the fact that the clocks of the APs 401 and 402 are required to have a certain minimum level of accuracy. In some embodiments, this can be represented according to the following:

$$\delta(t) = |t - \tilde{t}(t)| = \left| \int_0^t \eta_1(s) - \eta_2(s)ds \right| \leq 2 \cdot \eta_{max} \cdot t$$

where $\eta_1(s)-\eta_2(s)$ is the instantaneous CFO between the two APs 401 and 402. Let $\eta_{max1}$ denote the minimum required clock accuracy for the AP 401 and $\eta_{max2}$ denote the minimum required clock accuracy for the AP 402. Then a clock drift estimate over an interval $\Delta t$ may be denoted as $(\eta_{max1}+\eta_{max2}) \cdot \Delta t$. This estimate may denote an upper bound on clock drift over an interval of length $\Delta t$. If both APs 401 and 402 are Wi-Fi APs, then the minimum required clock accuracy is $\eta_{max1}=\eta_{max2}=20$ ppm$=20 \times 10^{-6}$ per the Wi-Fi Standard Specification. Therefore, the clock drift estimate over a time interval of length $\Delta t$ may be formed as $2 \cdot \eta_{max} \cdot \Delta t$, which amounts to a clock drift of 1 ms over an interval of 25 seconds.

Figure 5:
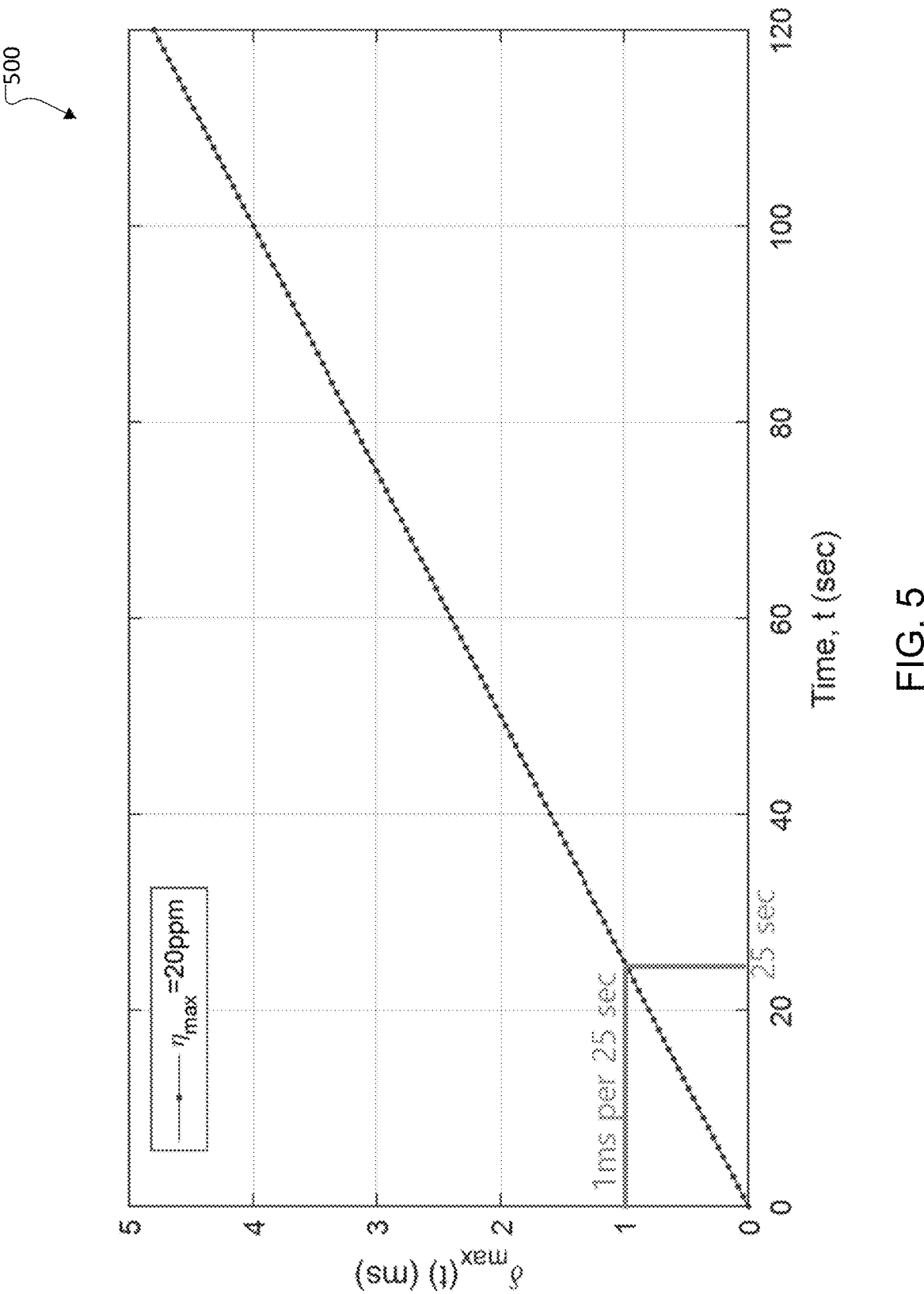
FIG. 5 illustrates an example plot showing a maximum clock drift that can occur among APs in a network over time.

FIG. 5 illustrates an example plot 500 showing a maximum clock drift $\delta_{max}(t)=2 \cdot \eta_{max} \cdot t$ as a function of time t. As shown in FIG. 5, the clock drift grows by at most 1 ms after every 25 seconds. In other words, 25 seconds after calculating offsets $\Delta_1$ & $\Delta_2$, the NAN TSF can differ by 1 ms between the AP 401 and the AP 402.

This clock drift can be considered in view of the maximum network tolerance of TSF timing error for NAN. In some embodiments, a large clock drift may require an early wakeup to compensate, and extra wait before transmission to allow other devices to wake up. Assuming a maximum 0.5 ms tolerance without implementation impact, the offset $\Delta_2$ should be refreshed within approximately 12.5 seconds.

To address these and other issues, this disclosure provides systems and methods for resynchronization of devices that use different timing references. As described in more detail below, the disclosed embodiments provide techniques to mitigate the impact of clock drift, among the unrelated sync providers, on the synchronization of the target network. This allows for resynchronization of the devices of the target network. Although the details below are provided assuming a Wi-Fi system as an example, this should not be considered as a restriction, and the provided embodiments are applicable to any wireless communication technology.

As discussed above, a first set of one or more devices of the target network may use a first USP, whereas a second set of one or more devices of the target network may use a second USP. In some embodiments, a device in the first set sends one or more sync beacons to resynchronize the target network after a time interval that depends on a clock drift estimate. In some embodiments, the time interval may further depend on target network synchronization error tolerance. In some embodiments, the device may be a device that was in a NAN master role before the start of USP-assisted synchronization.

However, using such a clock drift estimate may be pessimistic and result in unnecessarily frequent resynchronization (which can include, e.g., transmission of sync beacons, reception of sync beacons, and timing adjustment calculations). Therefore, the target network can implement another technique that uses one or more message exchanges between network devices (specifically the device in the first set and a device in the second set).

In some embodiments, the clock drift estimate may be determined based on one or more measurements of a timing difference. Such a clock drift estimate may vary over time and adapt to the actual observed clock drift between the USPs (instead of an upper-bound or worst-case clock drift as described above). For example, a device in the second set may estimate clock drift upon receiving a target network sync beacon, based on the adjustment applied to the (USP-assisted) target network reference time upon the reception of the target network sync beacon. Note that this adjustment term may be identical to the difference between the time as indicated in the target network sync beacon and the target network reference time maintained by the device using the USP. The estimate of clock drift may be equal to the adjustment term, or may be based on multiple past adjustments (e.g., the average of the past three adjustments.) In such a case, the clock drift estimate thus formed may indicate a smaller clock drift between the two USPs (e.g., merely 0.2 ms of clock drift over 25 seconds, instead of the upper bound of 1 ms over 25 seconds).

A device in the second set that forms a clock drift estimate may send an indication of this estimate to the device in the first set. The indication may be a quantized clock drift estimate, or a recommendation for a required sync beacon period. For example, if the clock drift is small, the recommended sync beacon period may be longer, and vice versa. The recommended sync beacon period may also depend on the target network synchronization error tolerance.

In some embodiments, the time interval can be determined as a function of the clock drift estimate: The higher the clock drift estimate, the shorter the time interval, and vice versa. The time interval may be measured from the time of the previous most recent resynchronization, or the time of the previous most recent target network sync beacon transmission, or the time of the previous most recent calculation of offsets by one or more devices. For example, if the clock drift estimate is 0.2 ms per 25 sec, and the synchronization error tolerance is 0.1 ms, then the time interval may be determined to be a value of 12.5 seconds or less. In other words, the device keeps the time interval between two sync beacon transmission windows no larger than 12.5 seconds.

Resynchronization procedure from the point of view of non-master device (a device in the second set): Any device in the second set that receives the sync beacon adjusts the reference time of the target network based on a timing indication in the sync beacon, then updates the offset between the time of its USP and the adjusted reference time of the target network. Once the offset is updated, the non-master device subsequently uses the updated offset and the time of its USP to derive the reference time of the target network. In some embodiments, the non-master device may be required to wake up and scan for target network sync beacons at an interval that depends on the clock drift estimate. This wakeup interval may indirectly depend on the clock drift estimate, in that the interval is configured by a master device in the first set that determined the configured value based on the clock drift estimate. These techniques will now be explained in greater detail in conjunction with the following figures.

Figure 6:
FIGS. 6 through 8 illustrate example systems for performing resynchronization of devices that use different timing references according to various embodiments of the present disclosure.

FIG. 6 illustrates an example system 600 for performing resynchronization of devices that use different timing references according to various embodiments of the present disclosure. As shown in FIG. 6, the system 600 includes multiple components that are the same as, or similar to, corresponding components of the target network 300 of FIG. 3. The system 600 includes multiple devices that are part of a target network, including devices 601 and 602. The device 601 is a NAN master device and the device 602 is a NAN non-master device.

The device 601 sends sync beacons 603 (i.e., NAN sync beacons) periodically, which are received by the device 602. Initially, the device 601 sends the sync beacons 603 at a first frequency, such as every 512 ms. The device 602 then adjusts its local clock based on the time indication in the received sync beacons 603. For example, $t_{NAN}$=NAN TSF for the device 601, and $t_{NAN,2}$=NAN TSF for the device 602.

At operation 605, the devices 601 and 602 determine that each can receive sync beacons 610 from a corresponding USP. For example, the device 601 can receive sync beacons 610 from the USP 611 (e.g., a first Wi-Fi AP), whereas the device 602 can receive sync beacons 610 from the USP 612 (e.g., a second Wi-Fi AP). The USPs 611 and 612 are distinct, and each has its own clock. The devices 601 and 602 determine to use their respective USPs 611 and 612 to maintain synchronization of their respective clocks for the target network.

At operation 615, each device 601 and 602 calculates an offset (e.g., an instantaneous time difference) between the reference time of the target network and the time as indicated in the sync beacon 610 of its USP 611 and 612. For example, the device 601 may calculate an offset $\Delta_1$ as:

$$\Delta_1 = t_{NAN}(t_0) - t_{USP1}(t_0)$$

where $t_{USP1}(t_0)$ denotes a time according to the timing indication in the USP 611's sync beacon 610 (for short, referred to as time according to the USP 611), and $t_{NAN}(t_0)$ denotes the reference time of the target network as kept by the clock of the device 601 at the time $t_0$.

Likewise, the device 602 may calculate an offset between the reference time of the target network and the time as indicated in the sync beacon 310 of its USP. For example, the device 302 may calculate an offset $\Delta_2$ as:

$$\Delta_2 = t_{NAN}(t_0) - t_{USP2}(t_0)$$

where $t_{USP2}(t_0)$ denotes a time according to the timing indication in the USP 612's sync beacon 610 (for short, referred to as time according to the USP 612), and $t_{NAN}(t_0)$ denotes the reference time of the target network as kept by the clock of the device 601 at the time $t_0$.

Once the offsets are calculated, the device 601 estimates a current clock drift and adapts the resynchronization interval based on the current clock drift. In other words, the device 601 changes the periodicity that the device 601 sends the sync beacons to the device 602. The new periodicity is less frequent than the previous 512 ms. In some embodiments, the new periodicity is determined based on the maximum synchronization error tolerance of the target network (e.g., 0.5 ms). As shown in FIG. 5, this would correspond to a maximum resynchronization interval of approximately 12.5 seconds. The new periodicity can be a multiple x of the 512 ms interval. In some embodiments, x may be in a range of 16 to 24, so the new periodicity may be every 8 seconds to 12 seconds, which is less than the maximum resynchronization interval of approximately 12.5 seconds. As shown in FIG. 6, at operation 620, the device 601 sends the sync beacon 603 every x*512 ms during a discovery window (DW). After each sync beacon 603 is received, the device 602 can recalculate the offset $\Delta_2$. In between the sync beacons 603, the device 602 can refresh its time $t_{NAN,2}$ using the sync beacons 610 from the USP 612.

It is noted that most APs have a better clock accuracy than the 20 ppm accuracy shown in FIG. 5. Thus, the refresh period can be adaptively increased to exploit better AP clocks. A technique that uses an adaptive refresh (or re-sync) period is described in FIG. 7.

Figure 7:

FIG. 7 illustrates another example system 700 for performing resynchronization of devices that use different timing references according to various embodiments of the present disclosure. As shown in FIG. 7, the system 700 includes multiple components that are the same as, or similar to, corresponding components of the target network 300 of FIG. 3. The system 700 includes multiple devices that are part of a target network, including devices 701 and 702. The device 701 is a NAN master device and the device 702 is a NAN non-master device.

The device 701 sends sync beacons 703 (i.e., NAN sync beacons) periodically, which are received by the device 702. Initially, the device 701 sends the sync beacons 703 at a first frequency, such as every 512 ms. The device 702 then adjusts its local clock based on the time indication in the received sync beacons 703. For example, $t_{TN1}$=NAN TSF for the device 701, and $t_{TN2}$=NAN TSF for the device 702.

At operation 705, each device 701 and 702 determines that it can receive sync beacons 710 from a corresponding USP. For example, the device 701 can receive sync beacons 710 from the USP 711 (e.g., a first Wi-Fi AP), whereas the device 702 can receive sync beacons 710 from the USP 712 (e.g., a second Wi-Fi AP). The USPs 711 and 712 are distinct, and each has its own clock. The devices 701 and 702 determine to use their respective USPs 711 and 712 to maintain synchronization of their respective clocks for the target network.

At operation 715, each device 701 and 702 calculates an offset (e.g., an instantaneous time difference) between the reference time of the target network and the time as indicated in the sync beacon 710 of its USP 711 and 712. For example, the device 701 may calculate an offset $\Delta_1(t_{USP1})$ as:

$$\Delta_1(t_{USP1}) = t_{TN1}(t_{USP1}) - t_{USP1}$$

where $t_{USP1}$ denotes a time according to the timing indication in the USP 711's sync beacon 710 (for short, referred to as time according to the USP 711), and $t_{TN1}(t_{USP1})$ denotes the reference time of the target network as kept by the clock of the device 701 at the instant when time according to the USP 711 is $t_{USP1}$.

Likewise, the device 702 may calculate an offset between the reference time of the target network and the time as indicated in the sync beacon 710 of its USP 712. For example, the device 702 may calculate an offset $\Delta_2(t_{USP2})$ as:

$$\Delta_2(t_{USP2}) = t_{TN2}(t_{USP2}) - t_{USP2}$$

where $t_{USP2}$ denotes a time according to the timing indication in the USP 712's sync beacon 710 (for short, referred to as time according to the USP 712), and $t_{TN2}(t_{USP1})$ denotes the reference time of the target network as kept by the clock of the device 702 at the instant when time according to the USP 712 is $t_{USP2}$.

Once the offsets are calculated, the device 701 estimates a current clock drift and adapts the resynchronization interval based on the current clock drift. In other words, the device 701 changes the periodicity that the device 701 sends the sync beacons 703 to the device 702 (i.e., the sync beacon period 720). The new periodicity is less frequent than the previous periodicity. This is similar to the process described in FIG. 6.

Based on the new sync beacon period, the device 701 continues to send sync beacons 703 to the device 702. In between the sync beacons 703, the device 702 can refresh its time $t_{USP2}$ using the sync beacons 710 from the USP 712. Similarly, the device 701 can refresh its time $t_{USP1}$ using the sync beacons 710 from the USP 711.

After receiving every sync beacon 703, the device 702 calculates a new offset $\Delta_2$. Based on any observed change in the offset $\Delta_2$ from one sync beacon 703 to the next, the device 702 can estimate the clock drift of the USP 712 with respect to the clock of the USP 711. This is indicated at 725. The clock drift over the resync interval is given by the difference between the previous $\Delta_2$ and new $\Delta_2$. In some embodiments, the device 702 can estimate the clock drift by using previous corrections applied to the offset $\Delta_2$, the sync beacon period 720, or a combination of these. For example, after a few offset measurements, the device 702 may determine that the clocks of the USPs 711 and 712 are not drifting apart very quickly, and therefore the required sync beacon period 720 can be extended to, e.g., 120 seconds instead of just 12 seconds.

Based on these measurements, at operation 730, the device 702 can send to the device 701 an indication of clock drift or an indication of the required refresh period. In some embodiments, the device 702 can send this indication in an SDF or a VSIE to let the device 701 know the required refresh period. At operation 735, after receiving the indication from the device 702, the device 701 can then modify the sync beacon period 720 in an AP-TSF-assisted-sync config message and send the new config message to other devices in the cluster. In some embodiments with multiple devices, the sync beacon period 720 can be determined based on the neediest device (i.e., the device connected to the AP with the poorest clock accuracy). However, devices connected to better APs can optionally refresh at their own required period even though the sync beacon period 720 from the device 701 is more frequent.

In some embodiments, the master device maintains its own internal clock, instead of using a USP. In such cases, only the non-master devices use a USP for clock synchronization. Such a technique is described in FIG. 8.

Figure 8:
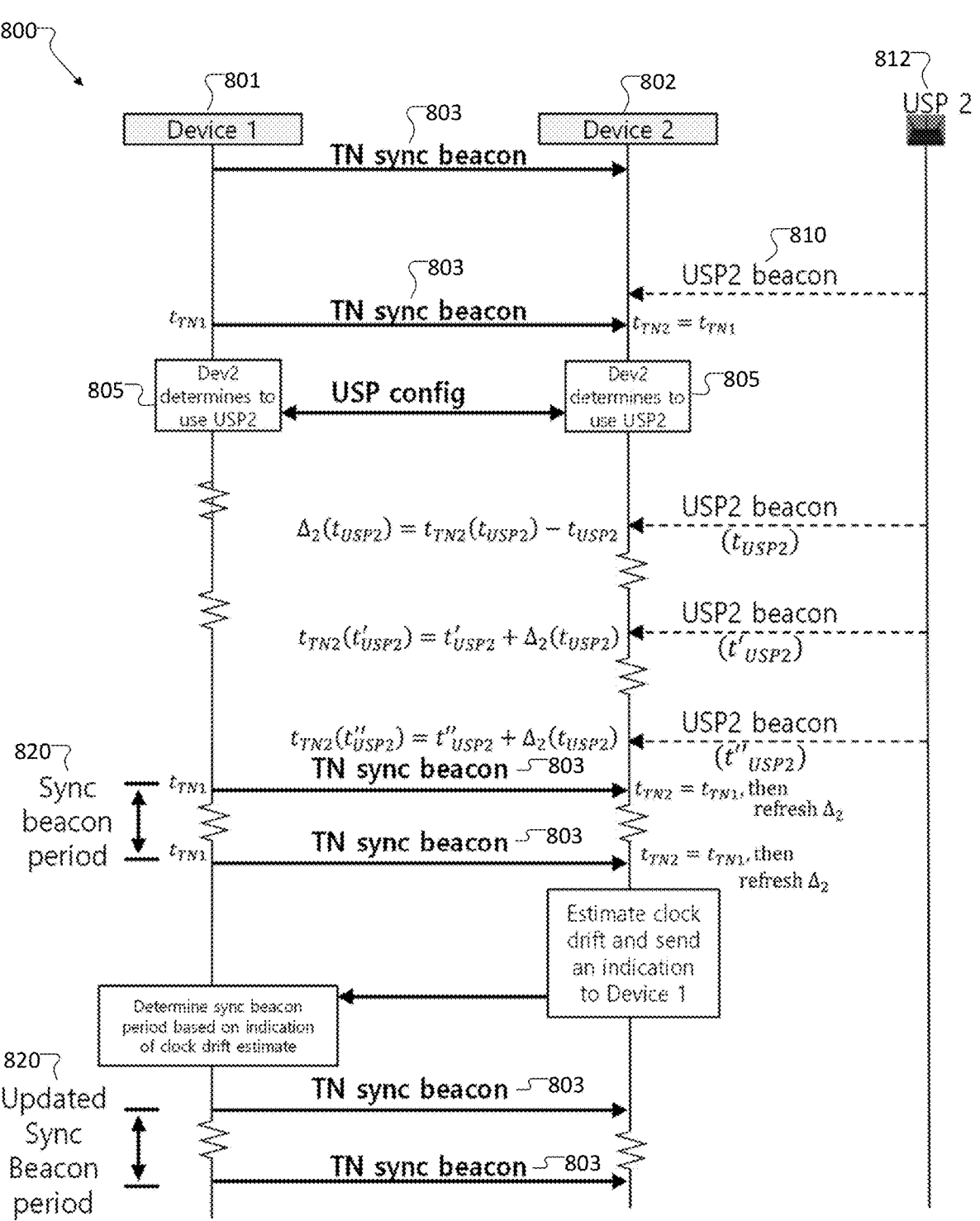

FIG. 8 illustrates yet another example system 800 for performing resynchronization of devices that use different timing references according to various embodiments of the present disclosure.

As shown in FIG. 8, the system 800 includes multiple components that are the same as, or similar to, corresponding components of the target network 300 of FIG. 3. The system 800 includes multiple devices that are part of a target network, including devices 801 and 802. The device 801 is a NAN master device and the device 802 is a NAN non-master device. In the system 800, only the device 802 is following a USP 812. In contrast, the device 801 maintains its own internal clock instead of using a USP.

The device 801 sends sync beacons 803 (i.e., NAN sync beacons) periodically, which are received by the device 802. Initially, the device 801 sends the sync beacons 803 at a first frequency, such as every 512 ms. The device 802 then adjusts its local clock based on the time indication in the received sync beacons 803. For example, $t_{TN1}$=NAN TSF for the device 801, and $t_{TN2}$=NAN TSF for the device 802.

At operation 805, both devices 801 and 802 determine that the device 802 will start using sync beacons 810 from the USP 812 in order to maintain synchronization of the device 802 clock for the target network. Hence, the device 801 can increase the sync beacon period 820 (i.e., transmit sync beacons 803 less frequently).

Later, the device 801 determines a new sync beacon period 820 based on an estimate of clock drift between its own clock and the USP 812 clock. In some embodiments, the clock drift can be determined by the device 802 using the same process as outlined in FIG. 7 (operations 725 and 730). The device 802 subsequently uses its offset $\Delta_2$ and the time according its USP beacon 810 to derive the target network reference time.

Figure 9:
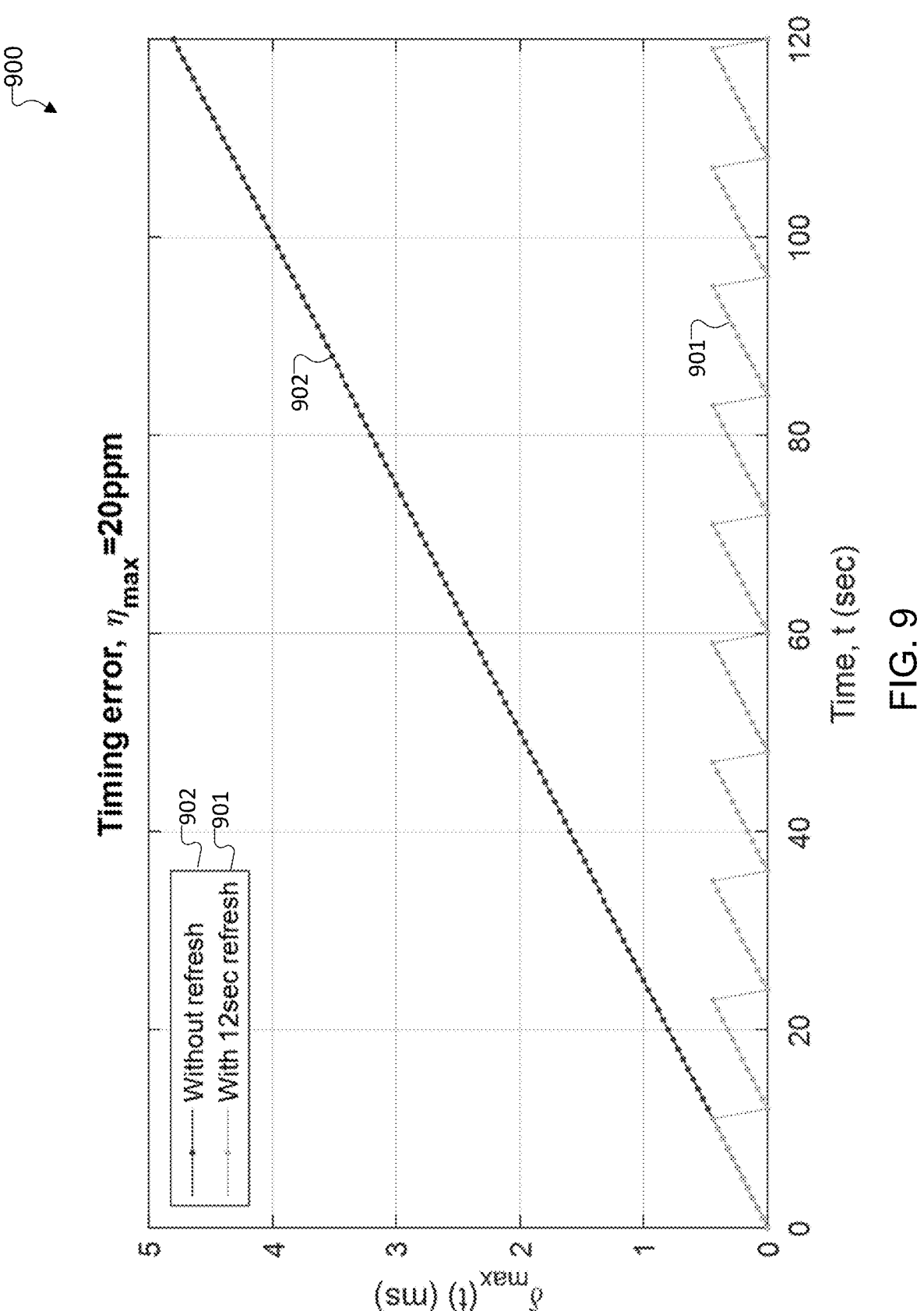
FIG. 9 illustrates an example residual timing error chart showing the impact of resynchronization of devices according to various embodiments of the present disclosure.

FIG. 9 illustrates an example residual timing error chart 900 showing the impact of resynchronization of devices according to various embodiments of the present disclosure. As shown in FIG. 9, the chart 900 includes two plots 901 and 902. The plot 901 shows the timing error using one or more of the resynchronization techniques disclosed herein. For the plot 901, it is assumed that the dormant master sends a re-sync beacon every 12 seconds, and other devices refresh their offset based on the re-sync beacon. With an adaptive re-sync period (based on an estimate of actually observed clock drift, such as described in FIG. 7), the re-sync beacon may be sent out even less frequently. As the plot 901 indicates, the worst-cast timing error is now bounded by approximately 0.5 ms. In contrast, the plot 902 shows the timing error without any kind of resynchronization or refresh. Over time, the timing error could grow to 5 ms or longer.

In some embodiments, the target network may include a third set of target network devices that use a third USP. This can be extended to also include a fourth set of target network devices and a fourth USP, and so on. In such a network, a clock drift estimate between the first USP (the USP used by a master device) and the third USP may be determined. A master device may then determine the time of transmission (or period) of the sync beacons based on all clock drifts, such as by using the maximum drift among the one or more clock drifts estimates.

Although FIGS. 3 through 9 illustrate example techniques for resynchronization of devices that use different timing references and related details, various changes may be made to FIGS. 3 through 9. For example, various components in FIGS. 3 through 9 could be combined, further subdivided, or omitted and additional components could be added according to particular needs. In addition, while shown as a series of steps, various operations in FIGS. 3 through 9 could overlap, occur in parallel, occur in a different order, or occur any number of times. In another example, steps may be omitted or replaced by other steps.

Figure 10:
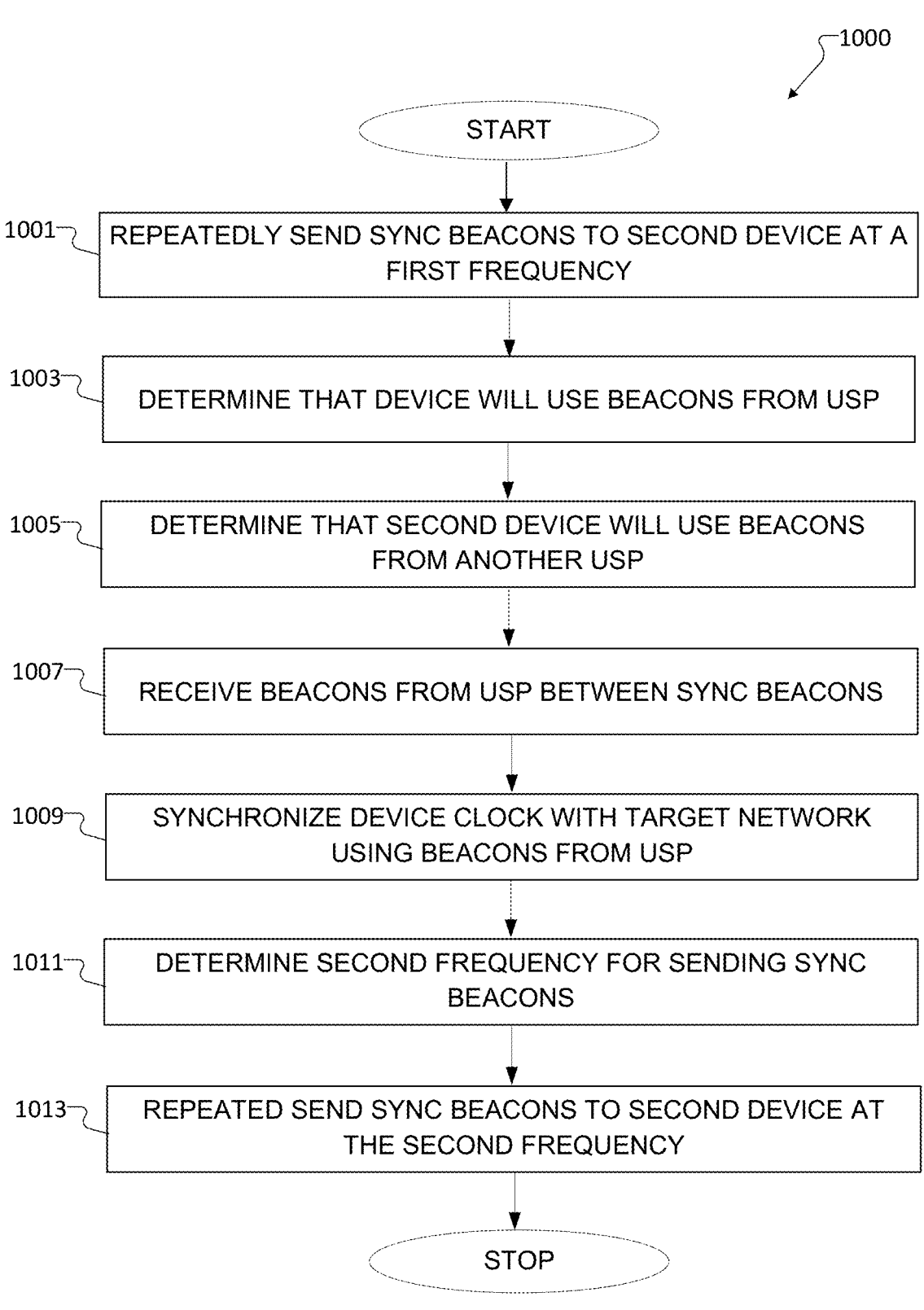
FIG. 10 illustrates a flow chart of a method for resynchronization of devices that use different timing references according to various embodiments of the present disclosure.

FIG. 10 illustrates a flow chart of a method 1000 for resynchronization of devices that use different timing references according to various embodiments of the present disclosure, as may be performed by one or more components of the wireless network 100 (e.g., the AP 101 or the STA 111), which may represent one of the master devices 301, 601, 701, or 801. The embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 1001. At step 1001, a device repeatedly sends sync beacons to a second device in a target network at a first frequency. This could include, for example, the device 701 sending sync beacons 703 to the device 702 at a periodicity of, e.g., 512 ms.

At step 1003, the device determines that the device will use beacons received from a USP device for synchronization of a clock of the device with the target network. This could include, for example, the device 701 determining that the device 701 will use sync beacons 710 from the USP 711 for synchronization of a clock of the device 701 with the target network, such as in operation 705.

At step 1005, the device determines that the second device will use beacons received from another USP device for synchronization of a clock of the second device with the target network. This could include, for example, the device 701 determining that the device 702 will use sync beacons 710 from the USP 712 for synchronization of a clock of the device 702 with the target network, such as in operation 705.

At step 1007, the device receives beacons from the device's USP device during a time interval between consecutive sync beacons that are sent to the second device. This could include, for example, the device 701 receiving sync beacons 710 from the USP 711 during a time interval between sync beacons 703 that are sent to the device 702.

At step 1009, the device synchronizes the clock of the device with the target network using the beacons from the device's USP device. This could include, for example, the device 701 using the sync beacons 710 from the USP 711 to calculate the clock offset $\Delta_1$ and obtain subsequent reference times of the target network by adding the clock offset to times indicated in subsequently received sync beacons 710 from the USP 711.

At step 1011, the device determines a second frequency for sending sync beacons that is less frequent than the first frequency. The second frequency is determined based on a maximum synchronization error tolerance of the target network. This could include, for example, the device 701 receiving a clock drift estimate of the USP 712 clock from the device 702, and determining the second frequency based on the received clock drift estimate.

At step 1013, the device repeatedly sends the sync beacons to the second device at the second frequency. This could include, for example, the device 701 sending sync beacons 703 to the device 702 at a periodicity of, e.g., 8 seconds to 12 seconds.

Although FIG. 10 illustrates one example of a method 1000 for resynchronization of devices that use different timing references, various changes may be made to FIG. 10. For example, while shown as a series of steps, various steps in FIG. 10 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
repeatedly sending, by a first device, sync beacons to a second device in a target network at a first frequency;
determining that the second device will use beacons received from an unrelated sync provider (USP) device for synchronization of a clock of the second device with the target network; and
repeatedly sending the sync beacons to the second device at a second frequency that is less frequent than the first frequency,
wherein the second frequency is determined based on a maximum synchronization error tolerance of the target network.

2. The method of claim 1, further comprising:
determining that the first device will use second beacons received from a second USP device for synchronization of a clock of the first device with the target network;
receiving, at the first device, beacons from the second USP device during a time interval between consecutive sync beacons that are sent to the second device; and
synchronizing the clock of the first device with the target network using the beacons from the second USP device.

3. The method of claim 2, wherein synchronizing the clock of the first device with the target network using the beacons from the second USP device comprises:
calculating a clock offset between (i) a time indicated in a first beacon from the second USP device and (ii) a reference time of the target network; and
obtaining subsequent reference times of the target network by adding the clock offset to times indicated in subsequently received beacons from the second USP device after the first beacon.

4. The method of claim 1, further comprising:
determining the second frequency, comprising:
receiving, from the second device, a clock drift estimate of a clock of the USP device; and
determining the second frequency based on the received clock drift estimate.

5. The method of claim 1, wherein the USP device comprises a Wi-Fi access point (AP) communicatively coupled to the second device.

6. The method of claim 1, wherein the second device is one device among a plurality of devices in the target network that all communicate with the USP device.

7. The method of claim 1, wherein the target network comprises a Wi-Fi neighbor awareness networking (NAN) cluster.

8. A device comprising:
a transceiver; and
a processor operably connected to the transceiver, the processor configured to:

control the transceiver to repeatedly send sync beacons to a second device in a target network at a first frequency;

determine that the second device will use beacons received from an unrelated sync provider (USP) device for synchronization of a clock of the second device with the target network; and control the transceiver to repeatedly send the sync beacons to the second device at a second frequency that is less frequent than the first frequency, wherein the processor is configured to determine the second frequency based on a maximum synchronization error tolerance of the target network.

9. The device of claim 8, wherein the processor is further configured to:

determine that the device will use second beacons received from a second USP device for synchronization of a clock of the device with the target network;

receive, via the transceiver, beacons from the second USP device during a time interval between consecutive sync beacons that are sent to the second device; and synchronize the clock of the device with the target network using the beacons from the second USP device.

10. The device of claim 9, wherein to synchronize the clock of the device with the target network using the beacons from the second USP device, the processor is configured to:

calculate a clock offset between (i) a time indicated in a first beacon from the second USP device and (ii) a reference time of the target network; and obtain subsequent reference times of the target network by adding the clock offset to times indicated in subsequently received beacons from the second USP device after the first beacon.

11. The device of claim 8, wherein the processor is further configured to determine the second frequency, comprising:

receive, from the second device, a clock drift estimate of a clock of the USP device; and determine the second frequency based on the received clock drift estimate.

12. The device of claim 8, wherein the USP device comprises a Wi-Fi access point (AP) communicatively coupled to the second device.

13. The device of claim 8, wherein the second device is one device among a plurality of devices in the target network that all communicate with the USP device.

14. The device of claim 8, wherein the target network comprises a Wi-Fi neighbor awareness networking (NAN) cluster.

15. A non-transitory computer readable medium comprising program code that, when executed by a processor of a device, causes the device to:

repeatedly send sync beacons to a second device in a target network at a first frequency;

determine that the second device will use beacons received from an unrelated sync provider (USP) device for synchronization of a clock of the second device with the target network; and repeatedly send the sync beacons to the second device at a second frequency that is less frequent than the first frequency, wherein the second frequency is determined based on a maximum synchronization error tolerance of the target network.

16. The non-transitory computer readable medium of claim 15, wherein the program code further causes the device to:

determine that the device will use second beacons received from a second USP device for synchronization of a clock of the device with the target network;

receive beacons from the second USP device during a time interval between consecutive sync beacons that are sent to the second device; and synchronize the clock of the device with the target network using the beacons from the second USP device.

17. The non-transitory computer readable medium of claim 16, wherein the program code to synchronize the clock of the device with the target network using the beacons from the second USP device comprises program code to:

calculate a clock offset between (i) a time indicated in a first beacon from the second USP device and (ii) a reference time of the target network; and obtain subsequent reference times of the target network by adding the clock offset to times indicated in subsequently received beacons from the second USP device after the first beacon.

18. The non-transitory computer readable medium of claim 15, wherein the program code further causes the device to determine the second frequency, comprising:

receive, from the second device, a clock drift estimate of a clock of the USP device; and determine the second frequency based on the received clock drift estimate.

19. The non-transitory computer readable medium of claim 15, wherein the USP device comprises a Wi-Fi access point (AP) communicatively coupled to the second device.

20. The non-transitory computer readable medium of claim 15, wherein the target network comprises a Wi-Fi neighbor awareness networking (NAN) cluster.

* * * * *